United States Patent [19]

Johnson

[11] Patent Number: 5,052,369

[45] Date of Patent: Oct. 1, 1991

[54] HEAT RETAINING FOOD CONTAINER

[76] Inventor: Kendrick A. Johnson, 8242 Queen Ave. S., Bloomington, Minn. 55431

[21] Appl. No.: 97,630

[22] Filed: Sep. 16, 1987

Related U.S. Application Data

[63] Continuation-in-part of Ser. No. 808,512, Dec. 13, 1985, abandoned.

[51] Int. Cl.$^5$ ............................................. A47G 23/04
[52] U.S. Cl. ..................................... 126/400; 106/246; 206/545; 219/10.55 E; 220/215; 220/429
[58] Field of Search ............................... 206/525, 545; 219/10.55 E, 378; 220/215, 429, 449, 3.1, 422; 252/70; 126/246, 375, 388, 400, 263

[56] References Cited

U.S. PATENT DOCUMENTS

| 3,148,676 | 9/1964 | Truog et al. ........................ 126/246 |
| 4,141,927 | 2/1979 | White et al. . |
| 4,158,126 | 6/1979 | Seitz . |
| 4,161,557 | 7/1979 | Suzuki et al. ................... 428/437 X |
| 4,179,499 | 12/1979 | Bowen . |
| 4,182,405 | 1/1980 | Hysen et al. ..................... 126/246 X |
| 4,246,884 | 1/1981 | Vandas .............................. 126/246 |
| 4,250,279 | 2/1981 | Robeson et al. . |
| 4,258,695 | 3/1981 | McCarton et al. ................ 126/375 |
| 4,380,794 | 4/1983 | Lawson . |
| 4,394,906 | 7/1983 | Hollenbeck ........................ 206/525 |
| 4,505,252 | 3/1985 | Wada et al. ........................ 126/246 |
| 4,510,919 | 4/1985 | Benmussa ........................... 126/263 |
| 4,530,344 | 7/1985 | Lyengor et al. ................... 126/246 |
| 4,559,921 | 12/1985 | Benmussa ........................... 126/263 |
| 4,567,877 | 2/1986 | Sepahbur .......................... 126/246 |

FOREIGN PATENT DOCUMENTS 1265502  5/1961  France ................................ 126/263

OTHER PUBLICATIONS

Article, "Heat-Retaining Capabilities of Selected Delivery Systems," by Lois Adamski Shea, R.D. (7 pages) Reprinted from the *Journal of American Dietetic Assoc.* vol. 65, No. 4, Oct. 1974.
Brochure, "An Introduction of Material Properties and Processing-ULTEM ® Resin," by General Electric Co. (19 pages), Undated.
Brochure, "ULTEM ® Polyetherimide for Dual Ovenable Applications" by General Electric Co. (12 pages), Undated.
Letter from Jerome H. Heckman, Esq., of Keller and Heckman, Washington, D.C. to Dr. Prakash Surana of General Electric Co., Regarding ULTRM ® Resin FDA Compliance, (3 pages), Mar. 1, 1982.
Letter from Olinda W. Rush of General Electric Co. to Kendrick Johnson, Regarding Patents Relating to ULTEM ® Polyetherimide Resin, (1 page), Sep. 12, 1985.
Brochurem, "GEPAX Engineered Plastics Packaging," by General Electric Co. (12 pages), Jul. 1985.
Technical Data Report, "Release No. 400, Plastic Waxes," by Petrolite Corporation (2 pages), Sep. 1982.
Technical Data Report, "Release No. 300 Hard Microcrystalline Waxes," by Petrolite Corporation (2 pages), Feb. 1983.
Brochure, "New Product Information: New Polycaprolactone Thermoplastic Polymers PCL-300 and PCL-700", by Union Carbide Corporation (15 pages), Circa Nov. 27, 1985.

(List continued on next page.)

*Primary Examiner*—Bryon P. Gehman
*Attorney, Agent, or Firm*—Kinney & Lange

[57] ABSTRACT

An improved heat retaining foodservice system including a heat retaining food cover (10), food container (310) and underbase (210), each including a heat storage system comprised of a sealed chamber therewithin, said chamber containing a layer of non-metallic heat storing material, such as micro crystalline wax enclosed by a layer of film for keeping food warmer for longer periods of time. Preferably, the food cover, container and underbase are each constructed of high-temperature stable polymeric material which is transparent to microwave radiation to facilitate heating of the heat storing material by use of a microwave oven, as well as by a conventional convection or radiant heat type oven.

15 Claims, 3 Drawing Sheets

OTHER PUBLICATIONS

Product Specification, "'Tone' P-300 Polymer," by Union Carbide Corporation (1 page), Aug. 23, 1983.
Product Specification, "'TONE' P-700 Polymer," by Union Carbide Corporation (1 page), Aug. 23, 1983.
Brochure, "The ENSOLITE® Family of Foams" by Uniroyal, Inc. (10 pages), 1983.
Brochure, "Tentative Physical Property Specification for Type IVC (ENSOLITE® Foam)," by Uniroyal, Inc. (2 pages), Apr. 1985.
Brochure, "Westlake Plastics Company-Thermoplastics for Industry," by Westlake Plastics Company (6 pages), Sep. 1984.
Brochure, "Basic Shapes Processed from ULTEM® Polyethersulfone Resin," by Westlake Plastics Company (2 pages), Undated.
Brochure, "Basic Shapes Processed from VICTREX® Polyethersulfone Resin," by Westlake Plastics Company (2 pages), Undated.
Brochure, "Aladdin-The Pellet Base Youn Don't Have to Heat," by Aladdin Industries, Inc. (3 pages), Undated.
Brochure, "Cost-Efficient Choices for Changing Times," by Aladdin Industries, Inc. (16 pages), 1983.
Brochure, "Counselor" vol. 6, Issue No. 1, Published by Aladdin Synergetics, Inc. (16 pages), 1984.
Brochure, "Counselor," vol. 7, Issue No. 1, Published by Aladdin Synergetics, Inc. (12 pages), 1985.
Brochure, "Everything You've Ever Wanted to Know About Efficient Hospital Feeding," by Caddy Corporation of America (20 pages), Aug. 1982.
Brochure, "TEMP-LOCK"® II for Modern Hospital Food Service, by Caddy Corporation of America (4 pages), 1983.
Brochure, "TEMP-LOCK® II for Hospitals & Nursing Homes," by Caddy Corporation of America (4 pages), Jan. 1979.
Brochure, "MEGA-TEMP® Pellet-Less," by Caddy Corporation of America (6 pages), 1985.
Brochure, (Catalog No. 450), "Cambro Quality Products and Superior Service for Foodservice Industry," by Cambro (40 pages), Apr. 1981.
Brochure, "Yesterday Finessa's Patented Plate Warmer Concept was an Innovative Breakthrough . . . Today it is Tried and Proven" by Finessa Corporation (4 pages), Undated.
Brochure, "60 Minutes Later . . . And Its Still Hot," by Seco Products (6 pages), Undated.
Brochure, "SECO® Unitized Bases", by Seco Products of Bastian Industries (6 pages), Undated.
Brochure, "Therma Tray Insulated Dome & Base," by Therma Tray Corporation (4 pages), Oct. 12, 1985.
Brochure, "DINET® Insulated Cover from DINEX®" by Dinex Products, A Division of Thermos Company (8 pages), 1984.
Brochure, "3M Technology Connects You to the Advanced Food Preparation Method," by 3M (9 pages), Undated.
Brochure, "Serve Them with Respect," by USECO (i.e., United Service Equipment Co.) (6 pages), Undated.

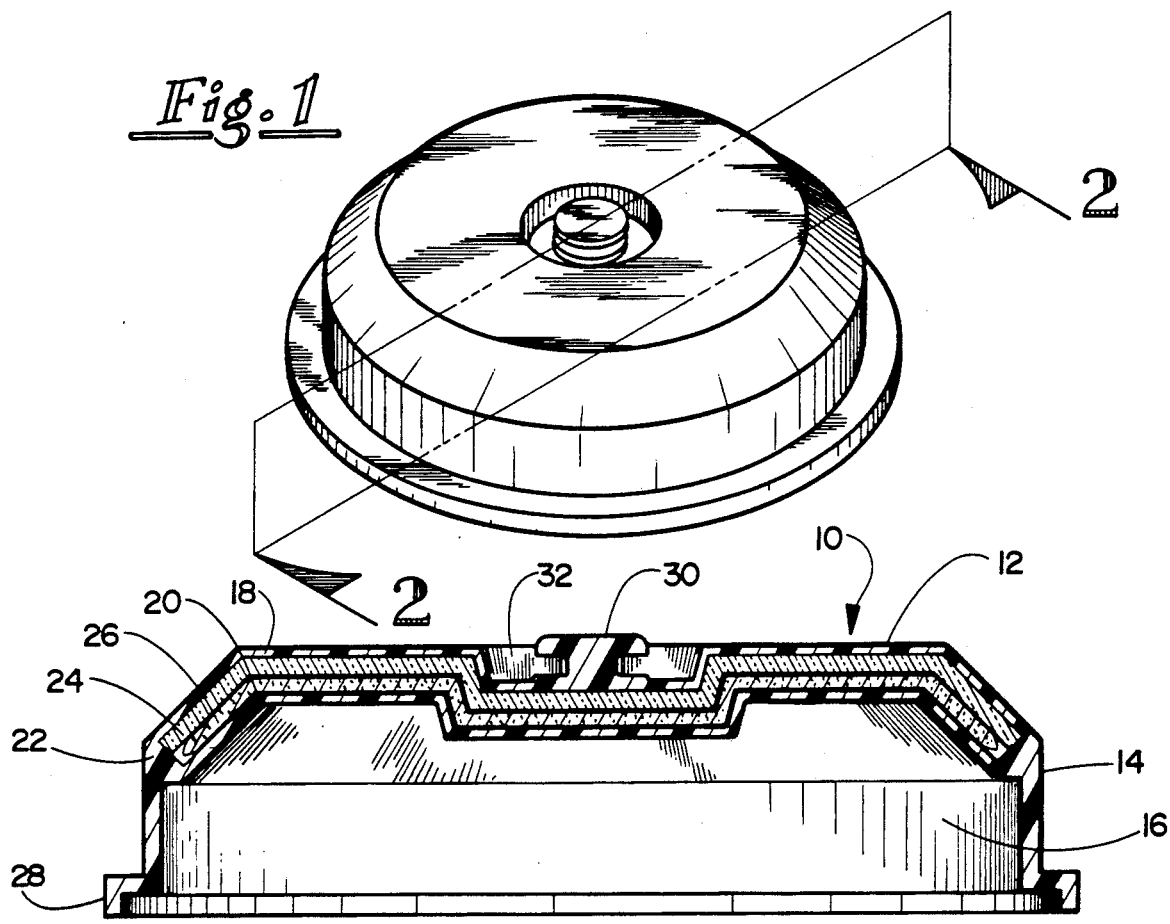
Fig. 1
Fig. 2
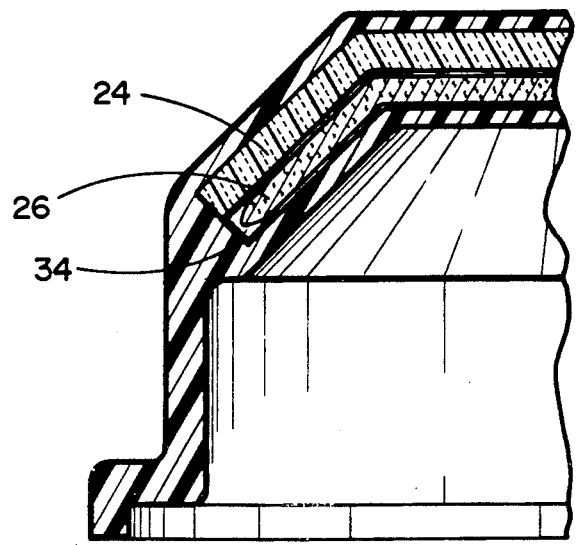
Fig. 3

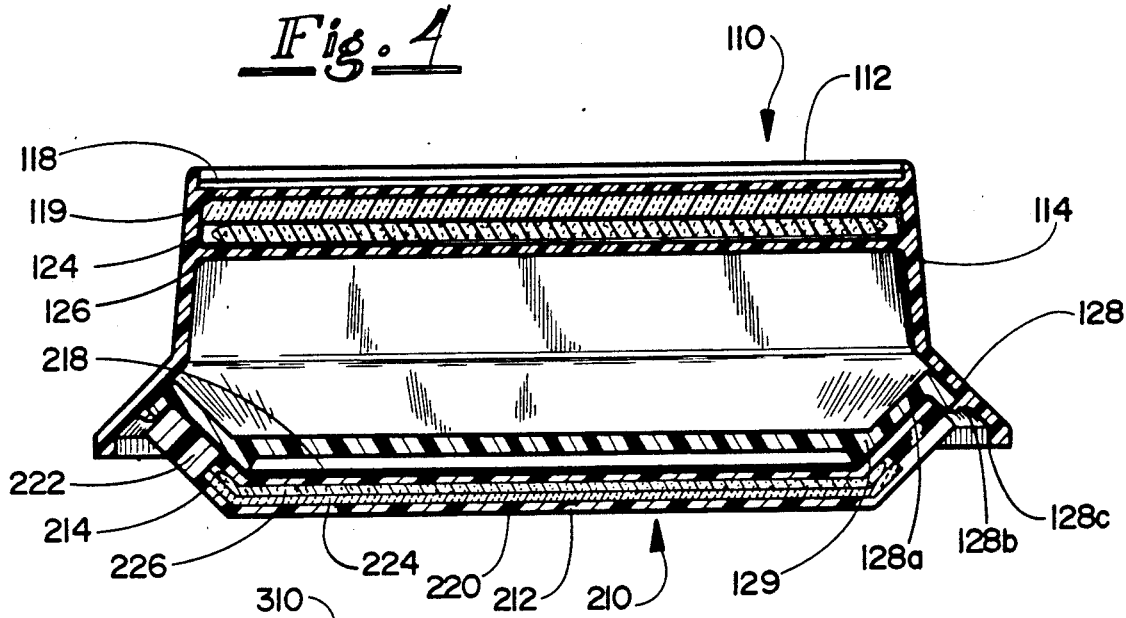
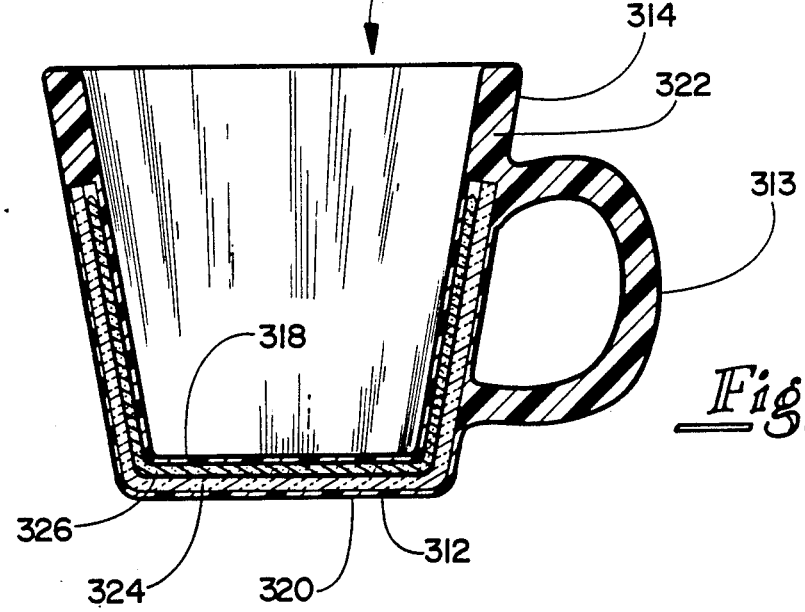

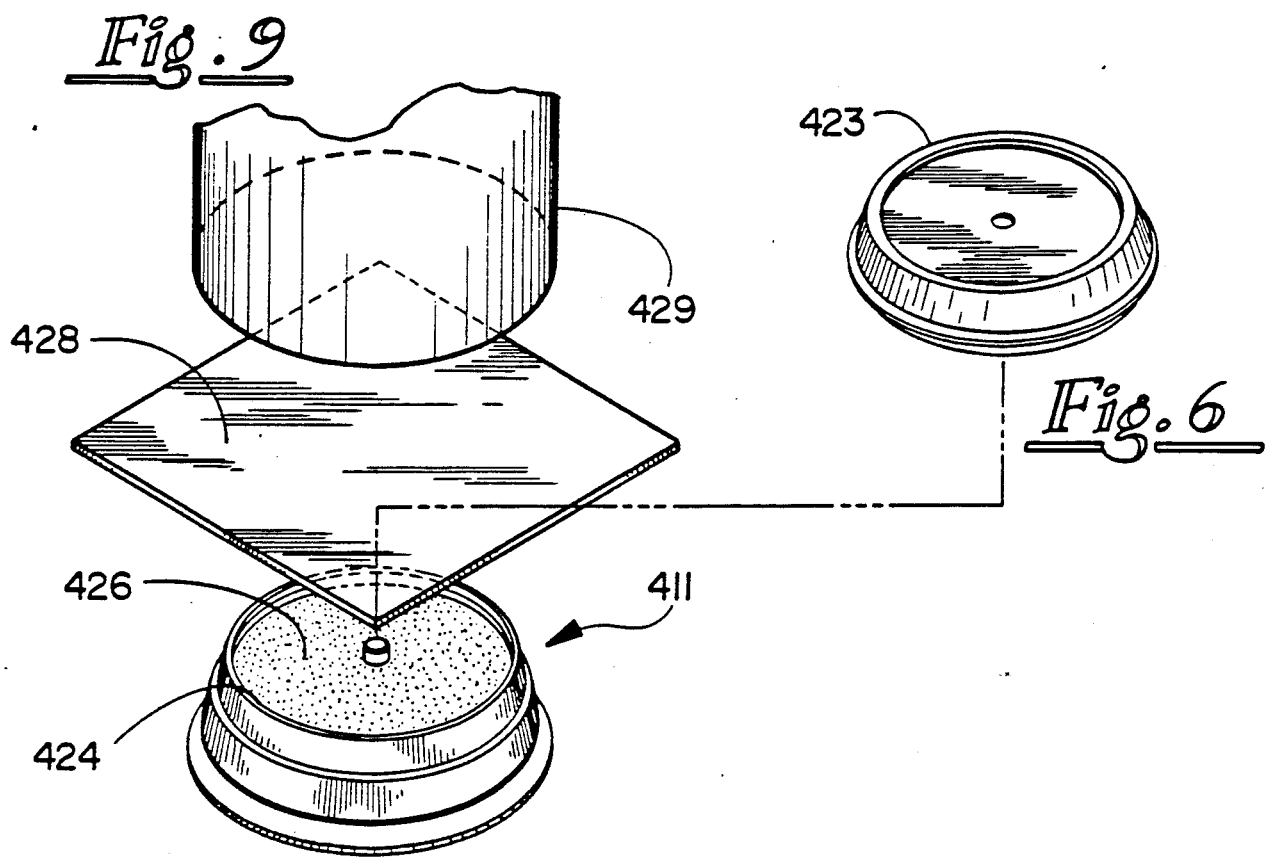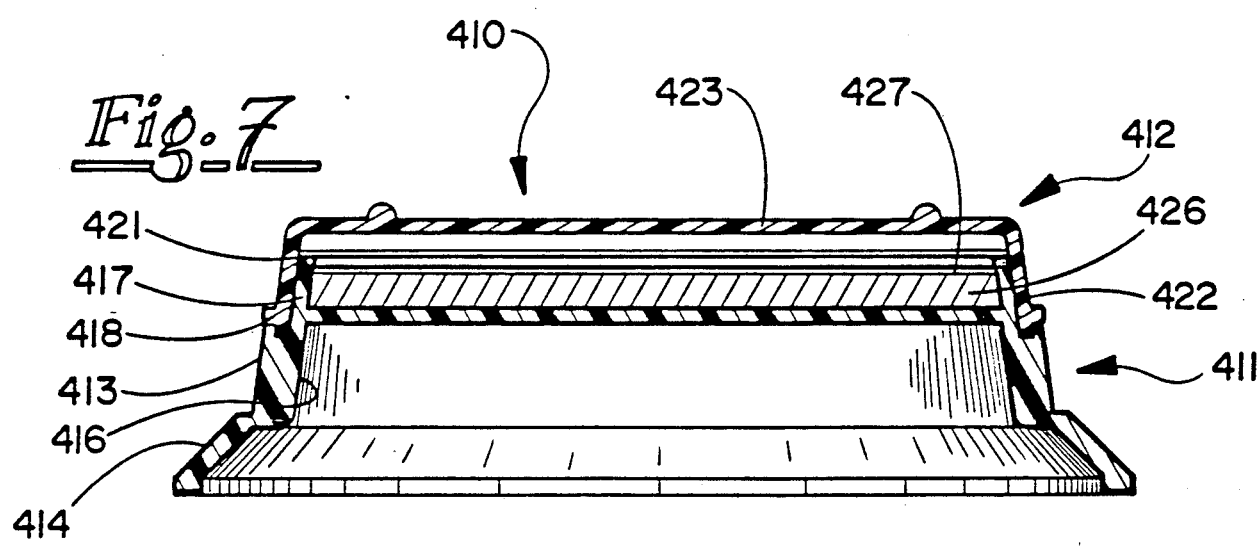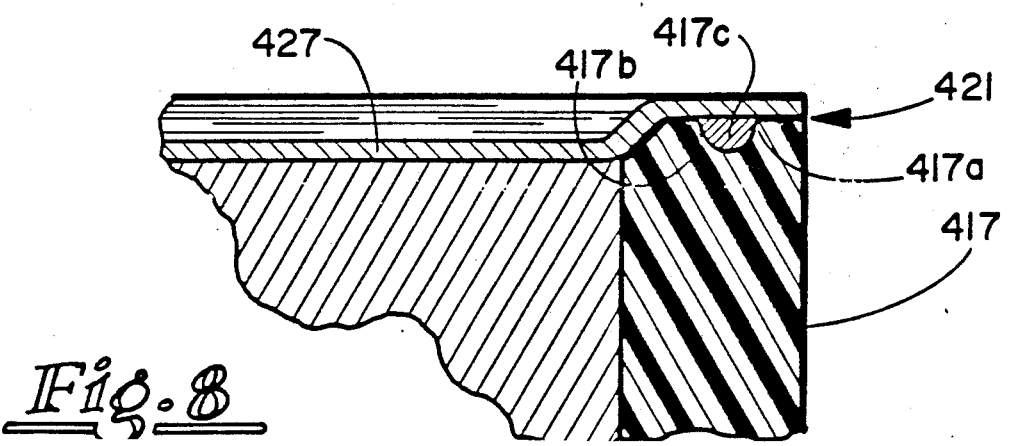

HEAT RETAINING FOOD CONTAINER

TECHNICAL FIELD

This is a continuation-in-part of U.S. patent application Ser. No. 808,512 filed Dec. 13, 1985, now abandoned.

The present invention relates generally to a foodservice system for keeping food warm. More particularly the present invention concerns a heat retaining food container which includes a heat storage system comprised of a sealed internal chamber filled with a heat storing material, such as micro crystalline wax, which melts upon application of heat from a microwave or conventional convection or radiant type heat source to keep covered food warm for an extended period of time. The containers are each preferably constructed in various corresponding shapes and sizes to facilitate use in combination as a heat retaining foodservice system.

BACKGROUND OF THE INVENTION

Food covers for the purpose of keeping food warm until being served have heretofore been available. Such devices are typically used in an institutional setting, such as hospitals, where the patients being delivered meals are located substantial distances from the central kitchen facility and a substantial delay typically occurs between the time that the food is first placed on the food container and when it is delivered to the patient.

Such food covers are typically passive devices which merely enclose the upper surface of the food container, and are not preheated prior to being placed over the food container, but only function to preserve the heat of the covered food. These covers are typically made of fiberglass, metallic or polymeric material and are generally suitable in those applications where a relatively short period of time passes between the time the food is covered and when it is delivered for service. Such passive devices, when used in institutional settings where substantial delay occurs between covering the food and delivery, and generally inadequate, resulting in food not being served at a proper temperature and thus not being appetizing. More significantly, food spoilage due to bacterial growth poses a serious health hazard when heated food cools below a minimum safe temperature. The U.S. Public Health Service requires, for example, that all potentially hazardous food be maintained at a temperature of 140° F. or above, until being served.

One approach heretofore utilized in an effort to overcome these problems has been providing a layer of insulation material within the food cover as a means to improve the passive heat-retention capabilities. Another approach which has been used is to provide an insulated underbase, on which, for example, a food-bearing dinner plate is placed. These insulated underbases may be used separately or in combination with an insulated food cover, as a foodservice system. Such approaches, however, have not been completely satisfactory, since the addition of insulation only results in a slightly improved heat-retention performance, and is still not capable of maintaining an elevated food temperature for substantial periods of time.

Another approach heretofore utilized in an effort to further improve the heat-retention capabilities of the foodservice system has been the use of metallic heat-storing masses, referred to as pellets, to act as a heat storage system, which will absorb and store heat upon being heated by a conventional convection or radiant heat source. The heated pellet is then placed beneath the food container, such as a dinner plate, and gradually releases stored heat toward the food container. Such metallic heat storage methods have heretofore been utilized in food covers as well. These approaches have also not been completely satisfactory, however, since the weight of the metallic heat storing material, when molded within a cover made of polymeric material, frequently causes the cover to break easily. Furthermore, the metallic pellet material is expensive, and the metallic heat storage system is capable of only being heated by a convection type heat source. None of these metallic heat storage systems are feasible for heating by microwave radiation.

Thus, there is a need for an improved heat retaining foodservice system, comprising a food cover, container and underbase, utilizing a heat storage system which is capable of being heated by both microwave radiation and a conventional convection or radiant heat source, having a greater heat-retaining capacity, and being made out of relatively inexpensive materials.

SUMMARY OF THE INVENTION

The present invention is directed to a heat-retaining food cover for use with an underlying standard sized food plate or container, including a heat storage system comprised of a non-metallic heat storing mass, such as micro crystalline wax, enclosed within a sealed chamber of the food cover. The underside of said food cover is defined by an upper wall attached to a wall depending therefrom, with the material comprising said upper wall and depending wall being of polymeric material which is transparent to microwave radiation, heat-stable preferably to at least approximately 350° F., and more desireably to 400° F., chemically stable to detergents, and rinsing agents, and resistant to staining. Such polymeric material which would be suitable for these applications, for example, would be that commercially available from General Electric known as ULTEM ® 1000 Polyetherimide Resin, which has physical properties that permit this material to be safely heated in a conventional convection or radiant heat type oven at temperatures in excess of 400° F., as well as superior microwave transparency for use in a microwave oven, is highly resistant to a variety of chemicals, can be readily fabricated by injection molding, blow molding, and extrusion/thermoforming, and is relatively inexpensive for use as material therefor.

The present food cover has at least one chamber within the upper wall thereof, which encloses the heat storing mass. The heat storing mass is of a material that is non-conductive of electrical energy and thus is microwaveable. The heat storing mass is a material that is capable of storing substantially more calories per given weight than the polymeric material of the cover. The heat storing mass desirably changes from a solid to a liquid at about 175° F. or higher, e.g. at least 190° F. The mass takes on substantial caloric content when it changes from the solid state to the liquid state. The heat storing mass gives off the caloric content when it changes from the liquid state to the solid state. It is this giving off of caloric content that maintains food at an elevated temperature. The temperature at which the heat storing mass changes from solid to liquid and in turn from liquid to solid is called the fusion temperature. The fusion temperature (e.g. melting point) of the heat storing mass may be between 175° F. and 300° F., preferably between 175° F. and 250° F.

The heat storing mass may consist of any FDA approved material such as common paraffin, or may consist of materials combining paraffin with different percentages of other materials, such as stearic acid, carnauba wax, or sodium chloride, to obtain higher fusion temperatures. One material offering a relatively high fusion temperature, for example, is commercially available from D-M-E Company, a division of VSI Corporation, of Madison Heights, Mich., known as D-M-E FORMAX, being a polyethylene wax having an approximate composition of 60% paraffin, 20% ethyl vinyl acetate, 19% talc and 1% colorants, and having a fusion temperature of 212° F. Another material which would be suitable is a hard micro crystalline wax known as BE SQUARE ® 185, commercially available from Petrolite Speciality Polymers Group, of Petrolite Corporation, Tulsa, Okla., with a fusion temperature of 190° F.

The repeated cycling of the wax from solid to liquid and liquid to solid creates problems of leakage. In the present invention, it was found that such problems can be overcome.

To prevent the wax from leaking out of the food cover when in a heated liquid state, the chamber may be completely sealed off by a thin film, for example, the wax may be entirely enclosed within a pouch-like enclosure made of high-temperature stable, polymeric material having a higher degradation temperature than the wax or other heat storing material being used. Preferably, the pouch-like enclosure will be constructed of the same material comprising the food cover. The thin film may be of from 1 to 5 mils in thickness, preferrably 1 to 3 mils.

One embodiment of the food cover comprises an assembly of two separate parts to define a chamber within the upper wall thereof. The chamber is molded into the lower portion of the cover and is upwardly opening. The wax is placed in the chamber and the thin film is laid over the chamber and heat sealed to the upper edge of the chamber defining a sealed chamber. The leak-proof assembly consists of bonding the separate top wall panel to the remaining structure by such methods as back draft snap lock, spin weld, epoxy, ultra-sonic sealing, fusion or electomagnetic welding.

The food cover may also utilize insulation material which is superimposed over the heat storing mass to inhibit the transfer of heat from the heat storing mass to the outside of the food cover. Such insulation material, suitable for these applications, for example, would be a closed-cell foam material commercially available from Uniroyal, Inc., known as Ensolite ® foam, consisting of various proprietary blends of PVC/nitrile rubbers, polyethylene/EVA and other speciality polymers. However, a preferred material is foamed polyurethane. Alternatively, an air chamber may serve as insulation to minimize heat loss.

The present invention is further directed to a heat retaining underbase, having a heat storage system disposed therewithin of the type disclosed for the food cover, on which food dishes, such as a dinner plate, may be placed to keep the food warm for an extended period of time. The underbase may also utilize insulation material of the type disclosed for the food cover, which would preferably be disposed in a layer directly beneath that of the heat storing mass, to direct the heat radiating from the heat storing mass toward the food.

The construction of the underbase will comprise a variety of shapes and sizes properly adapted to accomodate the various food vessels or dishes which are to be placed upon it. It is contemplated that the construction of the underbase will also facilitate use in combination with the aforementioned heat-retaining food cover, if desired. It will further be appreciated that the underbase may be fabricated in various shapes and sizes which are each suitable for direct use as a food container, such as a soup bowl, beverage cup and the like.

If desired, the food cover, container or underbase could each also be provided with a means for indicating temperature, such as a thermometer. Another temperature indicator might include, for example, a temperature-sensitive material having color-changing properties, where particular colors are only displayed within known corresponding ranges of temperature.

The present food cover, container and underbase are, therefore, highly advantageous in that each are capable of being heated by both microwave radiation and a conventional convection or radiant type heat source. Moreover, the materials comprising said food cover, container and underbase, as well as the heat storage system disposed therewithin, are relatively inexpensive and permit fabrication of the food cover, container and underbase in a variety of shapes and sizes.

DESCRIPTION OF THE DRAWINGS

A more complete understanding of the invention may be had by reference to the following Detailed Description of the Invention when taken in conjunction with the accompanying drawings, wherein:

FIG. 1 is a perspective view of one embodiment of the food cover in accordance with the present invention;

FIG. 2 is a cross-sectional view of the food cover taken along a line 2—2 in FIG. 1;

FIG. 3 is an enlarged cross-sectional view of the food cover of FIG. 1;

FIG. 4 is a cross-sectional view of another embodiment of the food cover in accordance with the present invention, together with a cross-sectional view of the food underbase in accordance with the present invention, illustrating assembled use of the food cover and underbase in combination with a dinner food plate; and FIG. 5 is a cross-sectional view of a food container, namely a cup, in accordance with the present invention.

FIG. 6 is another embodiment of the invention shown in perspective;

FIG. 7 is a cross-sectional view of the embodiment of FIG. 6;

FIG. 8 shows an enlarged portion of the embodiment shown in FIG. 7;

FIG. 9 is a view illustrating the method of constructing the embodiment of FIG. 6.

DETAILED DESCRIPTION OF THE INVENTION

Referring now to the drawings, wherein like reference numerals designate like or corresponding parts throughout the several views, and particularly referring to FIGS. 1-2, there is shown a first embodiment of the food cover 10 of the present invention. The first embodiment illustrates a food cover 10 comprising an upper wall 12 attached to a cylindrical side wall 14 depending therefrom and defining a compartment 16 within the underside of the food cover for enclosing food when placed over an underlying food container, such as a food plate. It will be understood that the particular shape of the food cover 10 is not critical to the practice of the invention, and may be comprised of a variety of shapes and sizes adapted for proper enclosure of the particular underlying food container.

The upper wall 12 is comprised of a top wall member 18 superimposed over a vertically-spaced bottom wall member 20, which converge at a point 22 within the side wall 14 to define a sealed chamber therewithin. Disposed within the sealed chamber are two layers of material sealed therein, the upper layer comprising an non-metallic heat storing mass 26, such as microcrystalline wax. The layer 26 is encased within a thin walled flexible pouch 34 such as of a polymeric material. The wax may be in the pouch prior to insertion into its place in the cover as hereinafter described.

In accordance with the invention, the material comprising the upper wall 12 and the side wall 14 are made of high-temperature stable polymeric materials which are suitable for placement in a conventional oven heated by convection or radiant heat, and which are also transparent to microwave radiation for the purpose of permitting the heat storing mass 26 to become heated within the sealed chamber. Similarly, the materials comprising the insulating material 24 should have microwave transparency and also operate to inhibit the transfer of heat from the heat storing mass 26 to the outside of the food cover 10. It will be understood, however, that the use of the insulating material 24 is optional, and that the use of microwaveable materials comprising the upper wall 12, side wall 14 and heat storing mass 26, to permit heating of the food cover 10 in a microwave oven, constitute significant features of the invention. The cover 10 may be molded of two pieces, a lower portion 10a and an upper portion 10b. The upper portion 10b has a downwardly extending peripheral wall 14a which mates with a recess 14b in the lower portion 10a. The wall 14a may be secured and sealed to recess 14b by an adhesive or welding.

As further illustrated by the first embodiment, the lower end of the side wall 14 is provided with a lip member 28 which is adapted for snugly engaging the peripheral edge of an underlying food container, such as a food plate. If desired, the food cover 10 may also be provided with a knob or handle for ease of lifting and handling the food cover. As is best shown in FIG. 2, there is illustrated a raised knob 30 which preferably is located within a central recess 32 of the upper wall 12 to facilitate stacking of multiple food covers.

Referring now to FIG. 3, the first embodiment of the present invention is shown enlarged illustrating containment of the heat storing material 26 by entirely enclosing the same within a sealed pouch-like enclosure 34. The pouch-like enclosure 34 is comprised of suitable materials, such as those comprising the food cover, having a higher degradation temperature than the fusion temperature of the heat storing material 26 when fully heated, in order to prevent any leakage of the heat storage material 26 when in a heated, liquid state. The film may be of any suitable thickness so long as it remains flexible at elevated temperatures or even at room temperatures. It is believed the flexible nature of the film assists in avoidance of leakage. The film desirably is of a thickness of 1 to 5 mils. Suitable materials include resins such as polyetherimide, polyethylene, polypropylene and the like. The film may be of any suitable film forming material that will maintain its integrity at the temperature encountered by the cover.

Referring now to FIG. 4, food cover 110, incorporating a second embodiment of the present invention, is shown. The food cover 110 is provided with a separate top wall panel 118 in the upper wall 112 of the cover 110 to facilitate installation of the layers of the insulating material 124 and heat storing material 126 within the chamber defined within the upper wall 112. The heat storing material is encased within a film as described with respect to cover 10. If desired, after placement of the insulating material 124 and heat storing material 126 within the food cover 110, the top wall panel 118 can be secured by welding its peripheral edge 119 to the upper end of the side wall 114 of the food cover 110.

It will also be seen that the food cover 110 includes a side wall 114 having an outwardly flaring portion 128 at the lower end thereof. The inside surface of the outwardly flaring portion 128 includes three adjacent ridges 128 a–c forming two circular grooves therebetween adapted for snugly engaging the peripheral edge of either one of two correspondingly sized underlying food containers 129.

Also illustrated in FIG. 4 is a cross-sectional view of a heat retaining food underbase 210, comprising a lower wall 212 peripherally attached to an outwardly flaring side wall 214, thereby defining an upwardly open cavity in which a food container 129, such as a dinner food plate, rests. It will be understood that the particular shape of the underbase 210 is not critical to the practice of the invention, and may be fabricated in a variety of shapes and sizes adapted for proper support of the overlying food container 129 and to also facilitate use in combination with a heat retaining food cover 110, if desired.

The lower wall 212 is comprised of a top wall member 218 superimposed over a vertically-spaced bottom wall member 220, which converge at point 222 within the side wall 214 to define a sealed chamber therewithin. Disposed within the sealed chamber are two layers of material sealed therewithin, the upper layer comprising a non-metallic heat storing mass 226, such as micro crystalline wax, and the lower layer comprising an insulating material 224. The heat storing mass 226 is enclosed within a sealed pouch 226a as described with respect to cover 10.

In accordance with the invention, the material comprising the lower wall 212 and the side wall 214 are made of high-temperature stable polymeric materials which are suitable for placement in a conventional oven heated by convection or radiant heat, and which are also transparent to microwave radiation for the purpose of permitting the heat storing mass 226 to become heated within the chamber. Similarly, the materials comprising the insulating material 224 should have microwave transparency and also operate to direct the heat radiating from the heat storing mass 226 toward the food container 129. It will also be understood that the use of the insulating material is optional, and that the use of microwaveable materials comprising the underbase 210 and heat storing mass 226 disposed therewithin, to permit heating of the underbase 210 in a microwave oven, constitute significant features of the invention.

A cross-sectional view of a heat retaining food container 310, having a cup-like configuration, is illustrated in FIG. 5 in accordance with the present invention. The food container 310 comprises a lower wall 312 peripherally attached to an upright side wall 314, thereby defining an upwardly open cup-like cavity in which beverages may be contained. The food container 310, if desired, may also be provided with a handle 313 attached to the outside of the side wall 314 for ease of lifting and holding the food container. It will be understood that the particular shape of the food container 310 is not critical to the practice of the invention, and may be fabricated in a variety of shapes and sizes adapted for properly containing various foods, such as soup bowls, beverage cups, dinner plates and the like.

The lower wall 312 is comprised of a top wall member 318 superimposed over a vertically-spaced bottom wall member 320, which converge at a point 322 within the side wall 314 to define a sealed chamber therewithin. Disposed within the sealed chamber are two layers of material sealed therewithin, the upper layer comprising a non-metallic heat storing mass 326, such as micro crystalline wax encased within a film enclosure 326a, and the lower layer comprising an insulating material 324. The lower wall 320 may be secured in place by adhesive or by welding.

In accordance with the invention, the material comprising the lower wall 312 and the side wall 314 are made of high-temperature stable polymeric materials which are suitable for placement in a conventional oven heated by convection or radiant heat, and which are also transparent to microwave radiation for the purpose of permitting the heat storing mass 326 to become heated within the chamber. Similarly, the materials comprising the insulating material 324 should have microwave transparency and also operate to direct the heat radiating from the heat storing mass 326 toward the food or beverages contained therein. It will also be understood that the use of the insulating material is optional, and that the use of microwaveable materials comprising the food container 310 and heat storing mass 326 disposed therewithin, to permit heating of the food container 310 in a microwave oven, constitute significant features of the invention.

A further embodiment cover 410 is illustrated in FIGS. 6-9. The cover 410 is molded in two pieces, namely, a lower portion 411 and an upper portion 412. Lower portion 411 includes a circumferential wall 413, including a lower lip portion 414, an intermediate portion 416, and an upper portion 417. The lip portion 414 is suitable for engagement upon superimposing the cover over a standard food container such as a plate. The intermediate wall portion 416, as illustrated, is a thickened portion for purposes hereinafter described. The upper wall portion 417 is of lesser dimension which provides for a shoulder 418 at the upper extreme of wall portion 416. The wall 417 has a pair of ridges 417a and 417b along its upper edge. A valley 417c is disposed between the ridges 417a and 417b. The lower member 411 includes an upper wall 419 which is spaced downwardly from the upper edge 421 of wall portion wall 417. The upper member 412 includes an outwardly flared circumferential wall 422 and an upper wall 423. The circumferential wall 422 is dimensioned to slide snuggly over the lower member wall portion 417 and rest upon the shoulder 418.

The cover 410 includes a heat-storing fuseable solid 426, for example, of a wax material which is suitable for storage of heat. The melting point of this material may be as aforedescribed. The wax 426 is disposed within the chamber provided by wall 419 and circumferential wall portion 417. The wax material 426 is sealed in such chamber by a layer of film 427 which is fused onto the upper extremity of wall portion 417 such as by heat fusion. The ridges 417a and 417b are rounded as illustrated in FIG. 8 to minimize or eliminate the possibility of fracture of the film 427 where the film and such ridges meet. FIG. 9 illustrates the method of application of the film 427 to the member 411. First the wax 426 is placed in the chamber 424. A layer of thin film 428 is superimposed over the combination of lower member 411 and wax 426. A heated platen 429 is then moved downwardly to fuse the film 428 to the upper edge 421 of wall 413, namely, ridges 417a and 417b. The temperature of the platen 429 is sufficient to provide fusion and strong adherence of the film 428 to the wall 417 but not sufficient to degrade the film. The platen 429 is then withdrawn, the film is permitted to cool and is then trimmed to conform to the shape of the wall 417. The upper member 412 is then placed over the lower member 411 and secured thereto such as by adhesive or welding.

From the foregoing, it will be apparent that the present invention relates to a new and improved microwaveable foodservice system, including a heat retaining food cover, container and underbase, having better heat-retention capability for keeping food warmer for longer periods of time, as is especially desirable in institutional settings.

Although preferred embodiments of the invention have been illustrated in the accompanying drawings and described in the foregoing Detailed Description of the Invention, it will be understood that the invention is not limited to the embodiments disclosed, but is capable of numerous modifications without departing from the scope of the invention as defined by the appended claims.

What is claimed is:

1. A heat retaining food container comprising:
   (a) a wall means defining a container for food, said wall means being transparent to microwave energy, said wall means defining a first sealed chamber;
   (b) at least one sealed second chamber within said first chamber; said second chamber being at least partially defined by flexible thin wall film, said wall means completely enclosing said second chamber; and
   (c) a heat storing mass contained within said second chamber, said mass comprising a fusible material which may be heated using microwave radiation, said material having a fusion temperature of at least 175° F. and less than the degradation temperature of said wall means;
   (d) said wall means and said heat storing mass being comprised of microwaveable materials, whereby said food container may be heated and placed adjacent to food for maintaining said food at an elevated temperature.

2. A heat retaining food container according to claim 1, wherein said heat storing mass comprises micro crystalline wax.

3. A heat retaining food container according to claim 2, wherein said second chamber comprises a sealed polymeric pouch-like enclosure to prevent leakage of said heat storing mass when heated to a molten state.

4. A heat retaining food container according to claim 2, wherein said wall means comprises polymeric material substantially transparent to microwave radiation and having a degradation temperature in excess of 350° F.

5. A heat retaining food cover according to claim 4, wherein said heat storing mass comprises micro crystalline wax having a fusion temperature in the range between 175° F. and 250° F.

6. A heat retaining food container according to claim 5, wherein said heat storing mass comprises a mixture of micro crystalline wax, ethyl vinyl acetate and talc.

7. A heat retaining food container according to claim 2, wherein said wall means includes an insulating means to inhibit the transfer of heat from said heat storing mass through the side of said wall means.

8. A heat retaining food container according to claim 2, wherein said wall means includes means for indicating the temperature of the food container.

9. A heat retaining food container according to claim 8, wherein said temperature indicating means comprises a material having temperature-sensitive color-changing properties, whereby each particular color displayed by said material indicates a corresponding known temperature of the food container.

10. A heat retaining food container according to claim 2, wherein said wall means comprises a structure defining a food cover adapted for use with an underlying food vessel, said wall means including an upper wall and a wall depending therefrom, whereby said food cover may be heated and placed upon an underlying food vessel for maintaining food situated on said food vessel at an elevated temperature.

11. A heat retaining food cover according to claim 10, wherein said food cover includes an insulation means to inhibit the transfer of heat from said heat storing mass to the outside of said food cover, said insulation means comprising a layer of insulation superimposed over said heat storing mass.

12. A heat retaining food cover according to claim 10, wherein said depending wall comprises a cylindrical side wall having a radially-extending wall portion at the lower end thereof, said insulation being transparent to microwave radiation.

13. A heat retaining food cover according to claim 10, wherein a means for lifting and handling said food cover comprises a raised knob centrally secured to the top of said upper wall thereof.

14. A heat retaining food cover according to claim 10, wherein said upper wall includes a separate panel disposed in the upper surface thereof providing access to said chamber for installation of said heat storing mass therewithin, said panel being subsequently welded to said cover.

15. A heat retaining food container according to claim 2, wherein said wall means comprises a structure defining an underbase adapted for use with an overlying food vessel, said wall means including a lower wall peripherally attached to an upwardly disposed side wall to further define an upwardly open receptacle, whereby said underbase may be heated and said food vessel placed into said receptacle of said underbase for maintaining food situated on said food vessel at an elevated temperature.

* * * * *